Sept. 26, 1950          B. A. STAMP          2,523,544

PIVOTED ARM JAR CAP WRENCH

Filed June 7, 1946

BURNIE A. STAMP *INVENTOR.*

BY Carl Miller

*ATTORNEY.*

Patented Sept. 26, 1950

2,523,544

UNITED STATES PATENT OFFICE 2,523,544

PIVOTED ARM JAR CAP WRENCH

Burnie A. Stamp, West Orange, N. J.

Application June 7, 1946, Serial No. 675,029

1 Claim. (Cl. 81—3.44)

This invention relates to an improved combination bottle cap and jar cap removing tool, and one of its objects is to provide a simple lever tool with a pair of levers pivotally connected to each other and provided with arched teeth adapted to grip the opposite sides of a jar cap, and with other arched teeth adapted to grip the sides of a bottle cap, one of the levers being also provided with a triangular can piercing lug and an edge hook, by means of which the lug can be forced into the end of a beer or other can, the other lever having an end tool adapted to be useful in displacing vacuum bottle caps and vacuum can tops.

With the above and other objects in view, the invention comprises certain new and useful constructions, combinations, and arrangements of parts, clearly described in the following specification, and fully illustrated in the drawings, in which.

Figure 1:
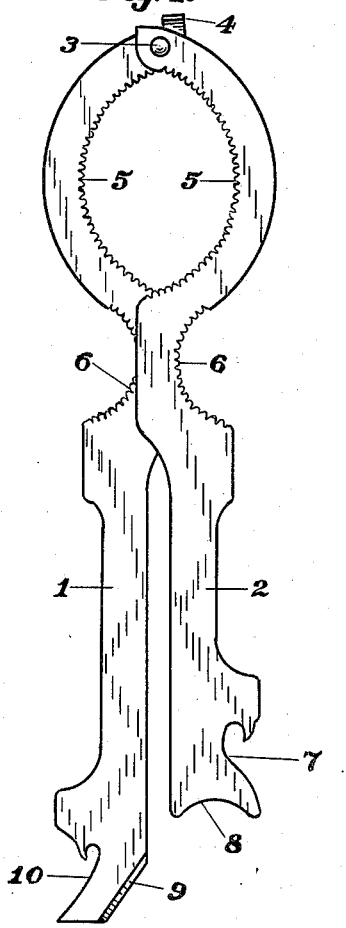
Fig. 1 is a top plan view, showing one of the levers in cross wise position on the other lever.
Figure 2:
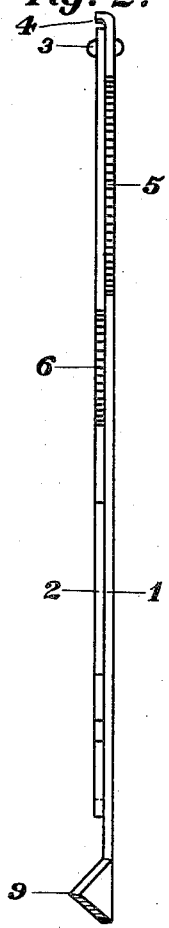
Fig. 2 is an edge view thereof.
Figure 3:
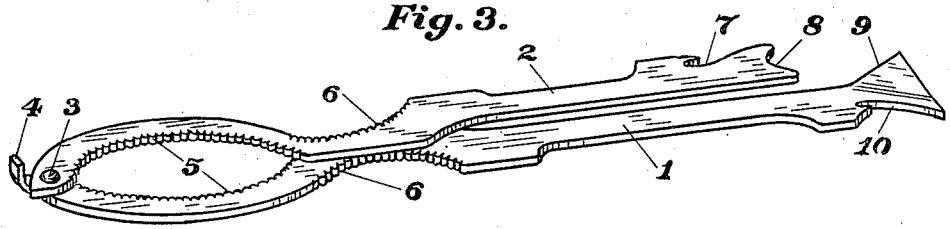
Fig. 3 is a perspective view.

Referring to the drawings 1 designates one lever member and 2 the companion lever member, which are pivotally connected to each other at 3. The lever member 1 is formed with a lug 4, located near the pivot 3, which forms a stop to limit the outward movement of the lever 2.

The levers 1 and 2 are formed with concave gripping jaws which are provided with confronting teeth 5, adapted to grip the opposite sides of a jar cap, and are further formed with concave gripping jaws which are provided with teeth 6. By swinging the levers on each other so that they will cross one another the gripping teeth 6 may be brought to engage the opposite sides of the bottle cap to be removed or tightened.

The lever member 2 is formed on its forward end with a bottle cap removing hook 7, and with an end tool 8, which has a concave curved edge adapted to be placed in contact with the convex curved outer surface of a bottle or can having a suction sealed cover or cap connected thereto.

The lever member 1 is formed with a triangular lug or tooth 9, and with a hook 10 which is adapted to engage the edge of a beer or similar can, so that the triangular lug or tooth 9 may be forced into the end of the can, and a large hole formed in the can.

It is thus seen that I have provided a single tool construction which can be used for removing or attaching jar caps, or used for removing or attaching bottle screw caps, or used for removing vacuum bottle or vacuum can tops, or used for puncturing beer and similar cans, to form large pouring openings in the ends thereof.

The levers are preferably constructed of steel, but may be made of any material suitable for the purposes set forth.

The small arched toothed gripping jaws are so arranged that they can be brought into use by swinging the levers into crossed relation, and then gripping the bottle screw cap between the small arched tooth gripping jaws.

The improved tool provides means for performing any work required in any ordinary household, in the removing of bottle caps, of the crimped type, in removing bottle caps of the screw type, in removing bottle and can tops of the vacuum type, and in puncturing juice and beer, and even oil cans, to obtain quick pouring.

It is understood that various changes in the details of construction, their combination and arrangement, may be made, within the scope of the claim herein set forth.

Having described the invention, I claim as new:

A jar opener comprising two flat levers pivoted together at one end, disposed one above the other in order to facilitate overriding of said levers, and forming a handle portion on the other end, each of said levers having adjacent the pivot a first outcurved portion the concave face of which is serrated, the two oppositely disposed first outcurved portions of both levers forming a first gripping jaw, and each of said levers having adjacent said first outcurved portion a second outcurved portion the concave face of which is serrated, the concave faces of each of said levers being disposed in opposite direction, the two oppositely disposed second outcurved portions of both levers upon overriding one of said levers relative to the other forming a second gripping jaw of different radius than that of said first gripping jaw.

BURNIE A. STAMP.

REFERENCES CITED

The following references are of record in the file of this patent:

UNITED STATES PATENTS

| Number | Name | Date |
|---|---|---|
| 1,466,118 | Ciha | Aug. 28, 1923 |
| 1,994,532 | Ratzlaff | Mar. 19, 1935 |

FOREIGN PATENTS

| Number | Country | Date |
|---|---|---|
| 24,768 | Denmark | July 21, 1919 |